US006388225B1

(12) United States Patent
Blüm et al.

(10) Patent No.: US 6,388,225 B1
(45) Date of Patent: May 14, 2002

(54) PLASMA TORCH WITH A MICROWAVE TRANSMITTER

(76) Inventors: Heinz-Jürgen Blüm, Fritz-Winkler-Str. 1-2; Uwe Hofmann, Friedrich-Engels-Str. 77, both of D-07749 Jena (DE)

( * ) Notice: Subject to any disclaimer, the term of this patent is extended or adjusted under 35 U.S.C. 154(b) by 0 days.

(21) Appl. No.: 09/647,631

(22) PCT Filed: Apr. 1, 1999

(86) PCT No.: PCT/EP99/02413

§ 371 Date: Oct. 2, 2000

§ 102(e) Date: Oct. 2, 2000

(87) PCT Pub. No.: WO99/52332

PCT Pub. Date: Oct. 14, 1999

(30) Foreign Application Priority Data

Apr. 2, 1998 (DE) ........................................ 198 14 812

(51) Int. Cl.[7] ................................................ B23K 10/00

(52) U.S. Cl. .............................. 219/121.48; 219/121.43

(58) Field of Search ....................... 219/121.48, 121.43, 219/121.41, 121.47, 121.52, 121.59, 687, 690; 427/449; 204/298.37, 298.38; 156/345, 643, 646; 315/111.21

(56) References Cited

U.S. PATENT DOCUMENTS

| | | | | |
|---|---|---|---|---|
| 3,353,060 A | | 11/1967 | Yamamoto et al. | |
| 4,473,736 A | | 9/1984 | Bloyet et al. | |
| 4,611,108 A | | 9/1986 | Leprince et al. | |
| 4,943,345 A | * | 7/1990 | Asmussen et al. | 216/69 |
| 5,047,115 A | * | 9/1991 | Charlet et al. | 216/64 |
| 5,349,154 A | | 9/1994 | Harker et al. | |
| 5,734,143 A | * | 3/1998 | Kawase et al. | 219/121.43 |

FOREIGN PATENT DOCUMENTS

| | | |
|---|---|---|
| DE | 3738352 | 5/1989 |
| DE | 3905303 | 8/1989 |
| DE | 3915477 | 11/1989 |
| DE | 19511915 | 10/1996 |
| EP | 0104109 | 3/1984 |
| EP | 0296921 | 12/1988 |

* cited by examiner

*Primary Examiner*—Teresa Walberg
*Assistant Examiner*—Quang T Van
(74) *Attorney, Agent, or Firm*—Jordan and Hamburg LLP

(57) ABSTRACT

A plasma torch with a microwave transmitter which, for example, is used to coat surfaces and to produce radicals. The plasma torch exhibits a minimal energy loss during the transmission of microwaves to the produced plasma flame. The plasma torch includes a waveguide for transmitted microwaves and has a coaxial conductor. An electrode is provided with a duct, and a nozzle provided on the other end of the duct, the end facing away from the waveguide, are arranged in the coaxial conductor in an essentially axial manner. The plasma flame is produced at the nozzle. A coupling element is arranged between the waveguide and the coaxial conductor. The electrode is connected to the coupling element via a mounting plate and an electrically insulating intermediate element in a gas tight, thermally insulated manner such that microwaves are permitted to pass through.

18 Claims, 1 Drawing Sheet

PLASMA TORCH WITH A MICROWAVE TRANSMITTER

SPECIFICATION

Figure 1:
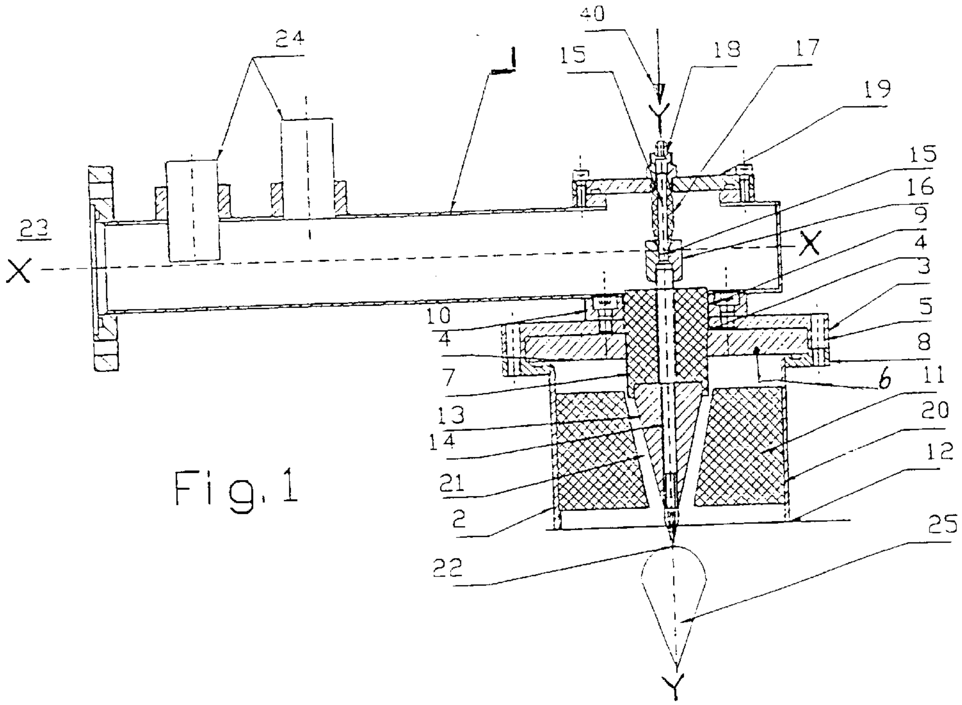

The invention relates to a plasma torch with a microwave transmitter, according to the kind of patent claims which, for example, is used to coat surfaces and to produce radicals.

Known magnetron-ion sources employ a magnetron for generating an alternating electric field; refer to DE 37 38 352 A1. It is an disadvantage that a quartz dome and external magnetic fields are required to generate the gas plasma. The intensive magnetic field in the discharge chamber is used to match the cyclotron frequency to that of the microwave generator. The operation of the microwave gas discharge takes place without electrodes. Furthermore, the operation requires a cooling of the device. Such plasma generators are of a complex structure and are limited in their dimensions. The technical expenditures for microwave gas discharges systems are high. It is not feasible to transmit high powers, and it is not evident that plasmas of high density are stable when high powers are concerned.

Devices for generating plasmas by microwaves, as known from, for example, DE 3905303 C2, DE 3915477 C2. U.S. Pat. No. 5,349,154 A, generally use quartz tubes. A magnetron (microwave transmitter unit) is secured to one end of a rectangular hollow guide. The generated microwaves pass through the hollow guide and impinge, at the other end of the hollow guide, upon a quartz glass insert through which a special gas flows. The flowing originates from a low pressure maintained in the recipient. In the quartz glass insert a plasma is generated by the microwave energy, and the plasma flows through the quartz glass insert into the recipient. The method is characterized by not having any electrodes. Such devices exhibit the following disadvantages:

- The hottest site and the center of the plasma are located in that portion of the quartz glass insert, which is arranged within the rectangular hollow guide. Hence, the energy is transformed before the recipient rather than within the same and, at a respective application, too little radicals are provided for the operation process.
- A high rate of wall effects occur within the quartz glass.
- The mass throughput and the effective pressures of 500 Pa to 3 kPa are too low.
- The quartz glass insert is not suited for any large-scale technical continuous operation. Due to the unintentional high temperatures the quartz glass insert shows melting effects, or there have to be additionally provided expensive cooling devices.
- The efficiency of the energy exploitation is low.
- It is difficult to maintain the vacuum tightness at the sealing faces.
- In the course of mounting and dismounting, respectively, and due to the thermal expansion of the metallic components it can be possible that the glass will be destroyed.

Furthermore, devices are known, in which a cross-coupling of a rectangular hollow guide with a coaxial guide is provided. Also in this case, a microwave generating device and a microwave transmitter device, respectively, i.e. a magnetron, are secured to one end of a hollow guide. The generated microwaves pass through the hollow guide and impinge upon a conductive longitudinally extending nozzle. The hollow guide is closed by a short-circuit slide. In this way, the resulting electromagnetic wave is tunable. Such a known arrangement can be designed with a quartz tube (DE 195 11 915 C2) or without one (U.S. Pat. No. 4,611,108 A). Apart from the fact that when using quartz tubes the specific disadvantages occur as mentioned above, this cross-coupling features the following disadvantages:

- The exploitation of the microwave output is of low efficiency.
- Energy losses occur at the cross-coupling between the rectangular hollow guide and the coaxial guide.
- The entire construction is complicated.
- The maximal operation pressure and the mass throughput are too little.

From U.S. Pat. No. 4,473,736 A a plasma generator is known, in which a cavity and a coaxial guide are capacitively coupled. Insulating thin disks supporting the electrode are arranged distributed along the entire cross-section of the cavity and the coaxial guide. Apart from not being a hollow wave guide, this arrangement is not suited for an impedance matching and for obtaining a low-reflective hollow wave conduction.

Hence, it is an object of the present invention to provide a plasma torch that generates plasma with high densities in a range near normal pressure. Thereby high powers are capable to be transmitted. A stable combustion and an efficient exploitation of the microwave energy shall be a feature of the plasma torch. Susceptible quartz tubes or quartz domes for generating plasmas have to be avoided. There is a plasma torch aimed at, which is simple in its entire setup.

According to the invention the object is realized by the features of the Patent claim. As a matter of fact, it is initially irrelevant whether or not the coaxial guide is, in a cross-coupling, directed transversally to the hollow guide or, in an axial coupling, in parallel to the hollow guide, whether consequently their longitudinal axes preferably include a right angle or whether or not their longitudinal axes substantially coincide. The plasma torch (plasma generator) comprises a vacuum chamber and a magnetron, which within the vacuum chamber generates itself a field intensity sufficient for plasma formation. A recipient succeeding the coaxial guide is under a pressure of 100 Pa to 10 kPa, this pressure is suited for the formation of a plasma. A high efficiency is attained irrespective of the kind of coupling. The inventional plasma torch does without a cooling and without magnet coils due to its simple axial setup with an antenna as an electrode. The advantage in using a hollow wave guide instead of an a. c.-waveguide lies in the fact that the microwave output is not only coupled in the plasma in the vicinity of the nozzle, where there are the highest field intensities, but via the hollow space waves along the entire hollow guide axis. Such a design permits a quasi-electrodeless coupling-in that reduces the thermal stress of the nozzle. Advantageously, the hollow electrode is designed as a truncated cone and secured to a non-conductive intermediate member that is connected to the coaxial guide via a preferably disk-shaped mount. The nozzle is connected to a gas inlet through this intermediate member. The mounting disk is flanged to the coaxial guide and to the hollow guide. Advantageously, the hollow electrode is designed as a truncated cone, the shell of which is in opposition to the recipient. The hollow electrode is provided with an exchangeable nozzle that is inserted, preferably screwed into the inside space; the nozzle comprises four exit orifices for the operation gas, the exit orifices are arranged in the exit plane, regularly spaced from each other on a circle centered about the exit plane. In this way, an optimal directing of the microwave to the exit plane (nozzle tip) is achieved and a favorable energy input into the plasma flame is attained. A nozzle adapted for high temperatures preferably consists of a metal-ceramic alloy. An electrically non-conductive insulator thermally insulates the space of the plasma flame from the coupling site. An advantageous solution for the operation of the plasma torch is obtained in rendering the electrode axially and, if necessary, radially adjustable. In the case of cross-couplings, a brass member and a second intermediate member preferably connect the nozzle and the first intermediate member to a gas inlet. The brass member in any case ensures the electromagnetic coupling of the hollow conductor and coaxial guide. The hollow guide, preferably a rectangular hollow guide, of the cross-coupling is provided with two screws for tuning the electromagnetic wave to the coupling. In the case of the hollow guide, preferably a round hollow guide, of the axial coupling, the tuning is advantageously carried out in that its length is variable. To this end the hollow guide consists of, for example, two parts that can be telescope like slid one into the other, also during operation. One of the tubes can be provided with longitudinal slots and in-between remaining resilient lugs. A microwave seal is advantageously provided in an annular groove located between the tubes in an overlapping range. At the transition from the coaxial guide to the recipient a vacuum passageway for the electrode and the operation gas is provided; in this way an efficient coupling of the electromagnetic wave is obtained.

Figure 2:
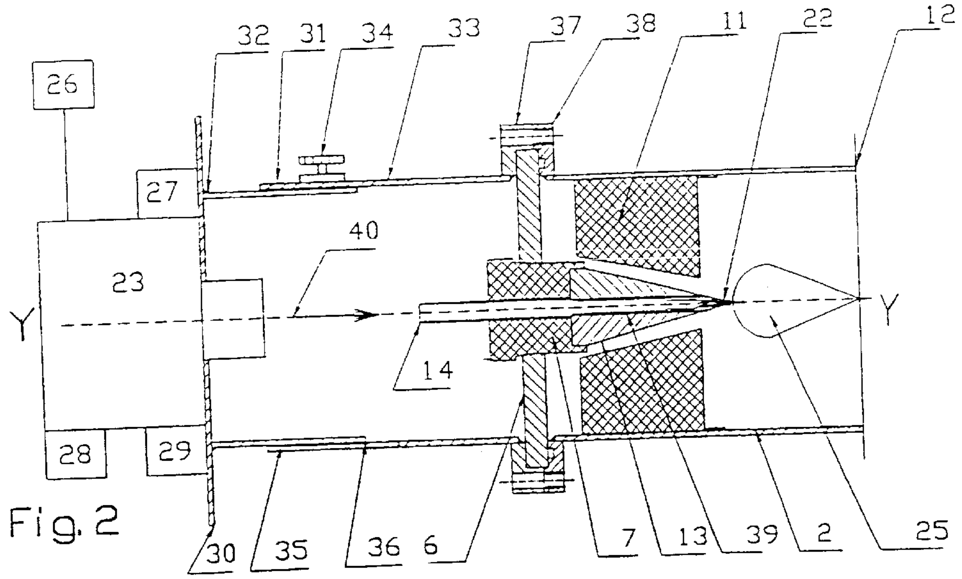
Figure 3:
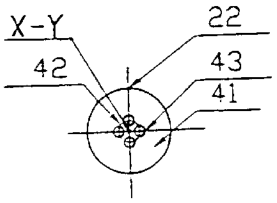

In the following, the invention will be explained in more detail by two schematical drawings illustrating two embodiments. There is shown in:

FIG. 1 a longitudinal cross section of a cross-coupling of a rectangular hollow guide with a coaxial guide;

FIG. 2 a longitudinal cross section of an axial coupling of a round hollow guide with a coaxial guide;

FIG. 3 an enlarged representation of a front view of the nozzle.

In FIG. 1, a cylindrical coaxial guide 2 having a longitudinal axis Y—Y is coupled by a coupling member 3 in the vicinity of one of its ends to a rectangular hollow guide 1 with a longitudinal axis X—X in such a way that the longitudinal axis X—X and Y—Y are at right angles to each other. The coupling member 3 is designed like a bowl with a central opening 4 and a circumferential flange 5 and contains a disk 6 for engaging an intermediate member 7 made of insulating material. By way of a ring 8 screwed to the circumferential flange 5, the disk 6 is rigidly and tightly connected to the coupling member 3. The central opening 4 in the coupling member 3 corresponds to a same opening 9 in the rectangular hollow guide 1. This opening is also surrounded by a flange 10, to which the coupling member 3 is screwed on tightly. The ring 8 is the end-portion of a hollow conductor 20 that comprises an insulator 11 at the other end of which a recipient 12 is provided. The mounting disk 6, the intermediate member 7, and the insulator 11 are designed strong enough and form together a gas-tight, thermally insulating crossover, however permitting passage of microwaves, between the rectangular hollow guide 1 and the hollow conductor 20. The intermediate member 7 additionally must have dielectric properties that ensure a low-reflection waveguiding at the crossover.

A cone-shaped electrode 13 made of a metal-ceramic alloy is secured to that side of the intermediate member 7 facing the recipient 12. The electrode 13, as is the intermediate member 7, is provided with an axial passageway 14 into which at the free end of the electrode 13 a nozzle 22 is secured or exchangeably inserted, preferably by screwing. The longitudinal axis of the electrode 13 coincides with the axis Y—Y. On the other side of the intermediate member 7, a brass member 16, which is provided with an axial bore 15, is connected to the passageway 14; an insulating connecting member 17 in continuation of the axial bore 15 is attached to the brass member 16 and leads to a gas inlet 18. The connecting member 17 is supported by a flat mount 19 which is tightly screwed to the rectangular hollow guide 1. The cylindrical hollow conductor 20 and the electrode 13 together form a coaxial guide 2. The electrode 13, which is in the shape of a truncated cone, is positioned in a respective recess 21 of the insulator 11 in such a way that the nozzle 22 projects beyond the insulator 11 on the side of the recipient.

The rectangular hollow guide 1 is provided with a magnetron 23 at its other end, the magnetron generates microwaves, which are transmitted through the guide 1. Two screws (steps) 24 are provided for affecting microwaves for the coupling. The microwaves generated by the magnetron 23 pass through the guide 1 and are tuned by the screws 24 to the coupling. By way of the cross-coupling a longitudinal wave is coupled out into the coaxial guide 2 so that an axial electromagnetic field results. The cross-coupling consists of a coupling rod that is substantially identical to the electrode 13, with which the coupling rod projects into the round hollow conductor 20, both together form the coaxial guide. The coupling rod 13 has the task to direct the operation gas and to assist in generating a plasma and a plasma torch 25, respectively, at the orifice of the nozzle 22. The gas supply into the coupling rod is provided from the external gas inlet 18 via the bores 15 in the connecting member 17 made of teflon and in the brass member 16, and via the passageway 14 of the intermediate member 7, which is also made of teflon. The brass member 16 also ensures a good coupling of the microwave. The electrode 13 is secured in and insulated against the coaxial guide 2 by the connecting member 7. The geometry of the electrode 13 is optimally adapted to the requirements of the procedure. It ensures a maximal dielectric strength. Its favorable length is important for its operation, which length can be varied by adjusting the passageway 14 by way of the thread in the electrode 13. Its cross-section is so selected that the coaxial guide 2 ensures an optimal guiding of the electromagnetic wave and that the highest field strength is obtained at the tip of the nozzle. This is very important since the plasma is ignited at the site of the greatest field strength. The nozzle 22 is made of a special material. It consists of a compound material, which has ceramic components and is metallically conductive. The task of the ceramics is to thermally insulate the plasma cloud from the electrode 13. The plasma is operable up to a pressure of 35 kPa. A considerably greater mass throughput can be obtained by that. This is a great advantage since considerably more co-reactants can be generated in a respective process. Thus it is feasible to strongly reduce the process times due to the considerably increased mass throughput. A further advantage of such a burner lies in the fact that these parameters can also be obtained with air as a process gas. Thus, one can do without expensive additional gases such as, for example, noble gases (argon).

In FIG. 2 an air-cooled magnetron 23 connected to a control device 26 is mounted on a base plate 30 together with a fan 27, a thermo-regulator 28, and a heating-current transformer 29. The magnetron 23 for generating the microwaves has an output of 2 kW and emits electromagnetic waves at a stable frequency of 2.45 GHz and a wavelength of 12.24 cm. Its output can be linearly controlled by the control device 26 between 10% and 100% of the maximal power. The thermo-regulator with a thermal circuit-breaker is connected to the resonator of the magnetron 23. At a temperature of 120° C. the thermo-regulator turns OFF the magnetron for safety reasons.

The base plate 30 is secured to a round hollow guide 31 that comprises an internal tube 32 which has a diameter of 100 mm and a wall thickness of 2 mm, and an external tube 33 which has a diameter of 104 mm and a wall thickness of 2 mm. The tubes 32, 33 are well-fitted one into the other and can be, telescope-like, mutually and slidingly displaced. They can be mutually fixed by a clamping screw 34. The external tube 33 is provided with longitudinal slots 35 (only one visible) in order to create a certain squeezing when the tubes are displaced, so that resilient lugs at the external tube 33 result between the slots 35 which slightly press against the interior tube, thus substantially preventing an unintentional mutual displacement of the two tubes 32, 33 even when the clamping is released. Simultaneously, the electrical contact between the tubes 32, 33 is improved thereby, and flash-overs between the tubes are avoided. In order to ensure a microwave sealing of the round hollow guide 31, a microwave seal 36, for example, in the form of a metallic gauze, can be inserted into the annular groove between the two tubes 32, 33. The external tube 33 is provided with a flange 37 at that of its ends facing away from the magnetron 23. This flange 37 provides for an axial coupling to a following coaxial guide 2 which has a common longitudinal axis X-Y with the round hollow guide 31. This coupling provides for coupling out of a longitudinal wave into the coaxial guide 2, and an axial electrical field results.

The coaxial guide 2, as well as the subsequent recipient 12 attached thereto, have the same diameter and cross-section, respectively, as the external tube 33. Thereby, the recipient 12 simultaneously fulfills the task of a hollow guide that prevents a lateral propagation of the waves, and in this way couples-in the microwave power into the plasma 25 over a considerable path behind the nozzle 22 along the axis X-Y (also along the axis Y—Y in FIG. 1). The coaxial guide 2 has also a flange 38 at its end which is facing the round hollow guide 31. This flange 38 matches the flange 37 and is screwed to the latter and forms with the latter a coupling member which corresponds to the coupling member 3 in FIG. 1. Both flanges 37, 38 encompass the circumference of an engaging disk made of any desired material (aluminium, quartz glass) and hermetically and firmly support the disk. The interior conductor 39 of the coaxial guide 2 is suspended electrically insulated in this disk 6 via an intermediate member 7 made of PTFE. The use of Teflon has the advantage that it is easily workable and that it ensures a permanent vacuum tightness. Furthermore, this vacuum passageway fulfills the task of passing the microwave on to the recipient 12 and of a thermal insulation of the hollow guide 32 from the hot plasma 25. The interior conductor 39 provides for the coupling of the round hollow guide and the recipient, for the supplying gas, and for the expansion of the gas into the recipient 12 via a nozzle 22 screwed into an electrode 13. In order to tune the microwave, the position of the interior conductor 39 in the coaxial guide 2 and its length are adjustable. The electrode 13 is secured to the intermediate member 7 and, as the latter does, has a passageway (14) for the gas supply. A compressed-air hose 40 made of PE (polyethylene) can be connected to this passageway 14 via a brass member (similar to that in FIG. 1). The intermediate member 7, the electrode 13, and the nozzle 22 form an antenna, the outer diameter of which is 20 mm. The longitudinal axis of the antenna coincides with the axis X-Y. The plasma 25 ignites at the nozzle 22 screwed into the end of the antenna. A detachable connection between the electrode 13 and the nozzle 22 is important, to enable exchange or renewal of the nozzle 22. Since the nozzle is exposed to very high thermal loads it is made of highly heat-resistant steel; for example, a metallic alloy is used having a maximal operation temperature of 1425° C. This material is characterized in that the nozzle 22 is metallic conductive and forms a ceramic surface under the influence of high temperatures that can resist the high temperatures. Since the frequency of the microwaves used lies below the plasma frequency, it can not propagate within the plasma 25. Hence, in order to realize as good as possible an energy input into the plasma 25, the surface of the plasma cloud has to take a maximum. Therefore, the nozzle 22 provides for a strong vorticity of the plasma 25. To this end and according to FIG. 3, four abaxial gas exit orifices 43 are provided in the exit plane 41 of the nozzle 22, in a preferably regular arrangement on a circle 42, each of the gas exit orifices having a diameter of 1 mm. In order to thermally insulate the plasma flame from the flanges 38, 39 and from the disk-shaped mount 6, respectively, a thermal insulator 11 is arranged between the disk-shaped mount 6 and the plasma torch 25, the electrode 13 and the nozzle 22 projecting through the thermal insulator 11. Just as the coaxial guide 2, the recipient 12 consists of a tube with a diameter of 104 mm, a wall thickness of 2 mm and a length of 300 mm. It can be provided with not shown means for temperature measurement, for pumping off, and for observing the flame. Advantageously, air is used as an operation gas. The operation of the plasma 25 is possible up to a pressure of 100 kPa. With that still a greater mass throughput can be obtained. The inventional axial coupling is particularly well suited to generate as high as possible an energy in the recipient and many radicals.

In total, the inventional axial coupling offers the following advantages:

It enables an efficient exploitation of the microwave power.

It permits an uncomplicated setup.

It ensures a high maximal operation pressure and mass throughput.

It eliminates the energy losses inherent in the cross-coupling.

The mutual fixation of the tubes 32, 33 can be achieved by using a clamping ring encompassing both tubes instead of using the clamping screw 34. For performing length variations of the round hollow guide 31, also a membrane bellow and exchangeable round hollow guide members can be used. It is advantageous for a fast, simple and precise adjustment of the length of the round hollow guide to be capable of adjusting the membrane bellow in steps or continuously also during operation of the inventional device along a linear guide.

All features disclosed in the specification, in the subsequent claims, and in the drawing can be substantial for the invention both, individually and in any combination with one another.

List of reference numerals

| | |
|---|---|
| 1 | rectangular hollow guide |
| 2 | coaxial guide |
| 3 | coupling member |
| 4, 9 | openings |
| 5, 10, 37, 38 | flanges |
| 6 | mounting disk (disk-shaped mount) |
| 7 | intermediate member |
| 8 | ring |

-continued

| List of reference numerals | |
|---|---|
| 11 | insulator |
| 12 | recipient |
| 13 | electrode (coupling rod) |
| 14 | passageway |
| 15 | axial bore |
| 16 | brass member |
| 17 | connecting member |
| 18 | gas inlet |
| 19 | mount |
| 20 | hollow conductor |
| 21 | recess |
| 22 | nozzle |
| 23 | magnetron |
| 24 | screws (steps) |
| 25 | plasma |
| 26 | control device |
| 27 | fan |
| 28 | thermo-regulator |
| 29 | heating-current transformer |
| 30 | base plate |
| 31 | round hollow guide |
| 32 | interior tube (inner tube) |
| 33 | external tube (outer tube) |
| 34 | clamping screw |
| 35 | (longitudinal) slot |
| 36 | microwave seal |
| 39 | interior conductor |
| 40 | compressed-air hose |
| 41 | exit plane of nozzle |
| 42 | circle |
| 43 | gas exit orifices |
| X-X; Y-Y; X-Y | (longitudinal) axes |

What is claimed is:

1. A plasma torch comprising:

a microwave transmitter for emitting microwaves;

a hollow guide for guiding the emitted microwaves;

a coaxial guide;

an electrode including a passageway;

a nozzle on the electrode at that end of the passageway facing away from the hollow guide;

said electrode and said nozzle being arranged in a substantially axial manner in said coaxial guide, whereby a plasma cloud is produced at the nozzle, said plasma cloud being directed towards a recipient;

a disk-shaped mount;

a coupling member coupling the hollow guide and the coaxial guide and gas tightly supporting the disk-shaped mount;

an electrically and thermally insulating intermediate member include a passageway and being arranged in the disk-shaped mount; and said electrode, on a side opposite the hollow guide, being connected gas-tightly, but transmissive to microwaves, to the electrically and thermally insulating intermediate member.

2. A plasma torch as claimed in claim 1, wherein said electrode is designed as a truncated cone.

3. A plasma torch as claimed in claim 2, wherein said nozzle and said electrode are adjustable in parallel and at right angles to the longitudinal axis of said hollow guide.

4. A plasma torch as claimed in claim 3, wherein the insulating connection of the electrode with the coupling member has the shape of an intermediate member provided in a variable suspension.

5. A plasma torch as claimed in claim 4, wherein the longitudinal axis of the electrode is transversally directed to the longitudinal axis of the hollow guide.

6. A plasma torch as claimed in claim 5, wherein at least one screw is provided in said hollow guide, said screw being adjustable transversally to the longitudinal axis of said hollow guide for tuning the microwave field.

7. A plasma torch as claimed in claim 1, 4 or 5 wherein the nozzle is provided with gas exit orifices, which are located outside of the nozzle axis.

8. A plasma torch as claimed in claim 4, wherein the longitudinal axis of the electrode is directed in parallel to the common longitudinal axis of the hollow guide and of the coaxial guide.

9. A plasma torch as claimed in claim 5 or 8, wherein a brass member provided with a bore is pre-positioned to that side of said electrode and said intermediate member, which is opposite to said hollow guide, said bore being arranged in the extension of the passageways through said electrode and said intermediate member.

10. A plasma torch as claimed in claim 9, wherein the passageways are connected to a gas inlet via the bores of the brass member and a connecting member.

11. A plasma torch as claimed in claim 6 or 7, wherein a thermal insulator is provided between the plasma cloud and the disk-shaped mount, the nozzle projecting beyond said thermal insulator in direction of said recipient.

12. A plasma torch as claimed in claim 8, wherein said hollow guide is composed of two tubes which are adapted to be telescope-like slid in and adjusted to one another.

13. A plasma torch as claimed in claim 12, wherein one of the two tubes is provided with longitudinal slots along a part of its length.

14. A plasma torch as claimed in claim 12 or 13, wherein a clamping means is provided for arresting the tubes.

15. A plasma torch as claimed in claims 12 or 13, wherein a microwave seal is provided in an annular groove between the two tubes.

16. A plasma torch as claimed in claim 1, wherein said nozzle is exchangeably secured in said passageway.

17. A plasma torch as claimed in claim 1, wherein the nozzle is made of a ceramic-metallic combination.

18. A plasma torch as claimed in claim 1, wherein the recipient is of a same cross-section as the hollow guide for the emitted microwaves and considerably projects beyond the nozzle tip.

* * * * *